(12) United States Patent
Sugatani et al.

(10) Patent No.: US 10,295,181 B2
(45) Date of Patent: May 21, 2019

(54) EXHAUST CONNECTION STRUCTURE AND COMBUSTION APPARATUS WITH EXHAUST CONNECTION STRUCTURE

(71) Applicants: NORITZ CORPORATION, Hyogo (JP); Living Engineering Co., Ltd., Tokyo (JP); Mirai Industry Co., Ltd., Gifu (JP)

(72) Inventors: Masaki Sugatani, Akashi (JP); Takanori Nagano, Kakogawa (JP); Hironao Matsunaga, Amagasaki (JP); Takahide Hasegawa, Kakogawa (JP); Kiyomi Kanamoto, Tokyo (JP); Yasuhide Satoh, Tokyo (JP); Shohei Matsuda, Ogaki (JP)

(73) Assignees: NORITZ CORPORATION, Hyogo (JP); TOKYO GAS LIVING ENGINEERING CO., LTD., Tokyo (JP); Mirai Industry Co., Ltd., Gifu (JP)

( * ) Notice: Subject to any disclaimer, the term of this patent is extended or adjusted under 35 U.S.C. 154(b) by 273 days.

(21) Appl. No.: 15/337,238

(22) Filed: Oct. 28, 2016

(65) Prior Publication Data

US 2018/0119953 A1    May 3, 2018

(51) Int. Cl.
*F23J 13/04*     (2006.01)
*F16L 19/065*    (2006.01)

(52) U.S. Cl.
CPC ............ *F23J 13/04* (2013.01); *F16L 19/065* (2013.01); *F23J 2213/203* (2013.01)

(58) Field of Classification Search
CPC ... F16L 19/0653; F16L 19/061; F16L 19/062; F16L 19/07; F23J 2213/203; F23J 13/04

USPC ......................................................... 285/903
See application file for complete search history.

(56) References Cited

U.S. PATENT DOCUMENTS

| | | | |
|---|---|---|---|
| D31,451 S | 8/1899 | Norris | |
| 3,326,560 A | 6/1967 | Trbovich | |
| 3,892,418 A | 7/1975 | Felt | |
| 4,340,089 A | 7/1982 | Freiherr von Arnim et al. | |
| 4,674,775 A * | 6/1987 | Tajima | F16L 19/0206 |
| | | | 285/903 |

(Continued)

OTHER PUBLICATIONS

An Office Action issued by the United States Patent and Trademark Office dated Dec. 4, 2017, which corresponds to U.S. Appl. No. 29/578,873 and is related to U.S. Appl. No. 15/337,238.

(Continued)

*Primary Examiner* — David Bochna
(74) *Attorney, Agent, or Firm* — Studebaker & Brackett PC

(57) ABSTRACT

An exhaust connection structure is constructed to connect a combustion apparatus and an exhaust tube having projections and recesses in an outer surface. The exhaust connection structure has a sealing member arranged on an outer circumferential surface of the exhaust tube and an exhaust joint arranged to sandwich the sealing member between the exhaust joint and the outer circumferential surface of the exhaust tube. The exhaust joint includes an engagement member and the engagement member has an annular portion and an engaging portion bent toward an inner circumference of the annular portion. The engaging portion is engaged with the projections and recesses in the exhaust tube.

9 Claims, 12 Drawing Sheets

(56) References Cited

U.S. PATENT DOCUMENTS

| | | | |
|---|---|---|---|
| D297,158 S | 8/1988 | Marton et al. | |
| D299,772 S | 2/1989 | Smith | |
| D300,574 S | 4/1989 | Smith | |
| 4,870,988 A | 10/1989 | Hood, Jr. et al. | |
| 5,261,707 A * | 11/1993 | Kotake | F16L 25/0045 285/903 |
| D348,097 S | 6/1994 | Inda et al. | |
| D354,801 S | 1/1995 | Grant et al. | |
| D356,456 S | 3/1995 | Henry | |
| 5,423,578 A * | 6/1995 | Kanomata | F16L 25/0036 285/903 |
| D368,516 S | 4/1996 | Matsumura | |
| 5,590,477 A | 1/1997 | Carfagno, Sr. | |
| 5,924,282 A * | 7/1999 | Thomas | F01N 13/1816 285/903 |
| D417,534 S | 12/1999 | Holston et al. | |
| 6,161,841 A | 12/2000 | Shaw | |
| 6,237,969 B1 * | 5/2001 | Amatsutsu | F16L 25/0036 285/903 |
| 6,345,844 B1 | 2/2002 | Miyajima et al. | |
| 6,435,567 B2 * | 8/2002 | Kikumori | F16L 25/0036 285/903 |
| 6,499,771 B1 | 12/2002 | Snyder, Sr. et al. | |
| 7,416,227 B1 | 8/2008 | Earnest | |
| 7,584,934 B1 | 9/2009 | Eichinger | |
| D614,271 S | 4/2010 | Weston | |
| 7,699,356 B2 | 4/2010 | Bucher et al. | |
| D659,922 S | 5/2012 | Krohmer et al. | |
| D676,940 S | 2/2013 | Kluss et al. | |
| D676,941 S | 2/2013 | Kluss et al. | |
| 8,474,878 B2 | 7/2013 | Richter | |
| D700,415 S | 2/2014 | Baker | |
| D705,402 S | 5/2014 | Yu | |
| D746,958 S | 1/2016 | Gledhill et al. | |
| D764,030 S | 8/2016 | Darling et al. | |
| 9,587,744 B2 | 3/2017 | Yoshida et al. | |
| D802,102 S | 11/2017 | Mursu et al. | |
| 2004/0080160 A1 * | 4/2004 | Rief | E04H 4/1654 285/903 |
| 2004/0183301 A1 | 9/2004 | Yoshida | |
| 2004/0232694 A1 * | 11/2004 | Martin | F16L 25/0045 285/903 |
| 2005/0285401 A1 * | 12/2005 | Treichel | F16L 19/065 285/903 |
| 2006/0006651 A1 * | 1/2006 | Watanabe | F16L 25/0036 285/903 |
| 2007/0040376 A1 * | 2/2007 | Choi | A47L 9/242 285/903 |
| 2007/0228727 A1 | 10/2007 | Matsuno et al. | |
| 2012/0285559 A1 | 11/2012 | Harper et al. | |
| 2015/0330510 A1 | 11/2015 | Doyle et al. | |
| 2016/0060873 A1 | 3/2016 | Sugatani | |

OTHER PUBLICATIONS

An Office Action issued by the United States Patent and Trademark Office dated Dec. 27, 2017, which corresponds to U.S. Appl. No. 29/578,875 and is related to U.S. Appl. No. 15/337,238.

* cited by examiner

EXHAUST CONNECTION STRUCTURE AND COMBUSTION APPARATUS WITH EXHAUST CONNECTION STRUCTURE

BACKGROUND OF THE INVENTION

Field of the Invention

The present invention relates to an exhaust connection structure and a combustion apparatus with an exhaust connection structure.

Description of the Background Art

An exhaust connection structure is described, for example, in U.S. Pat. No. 8,474,878. This document discloses a securing device which connects pipes through which a fluid passes. This securing device includes a clamping body, a retaining element, and a spacer. The clamping body is in an annular shape. Both of the retaining element and the spacer are formed integrally with the clamping body and protrude in the same axial direction from the clamping body. The clamping body is fitted to the outer circumference of the pipe. The retaining element is hooked on a protrusion at a pipe end portion. A tip end of the spacer abuts on the protrusion at the pipe end portion. This securing device improves tensile strength of the two pipes.

Sealability and facilitated construction should be considered for an exhaust connection structure connected to a combustion apparatus or the like. Decrease in number of parts has been demanded while aforementioned demands are met.

SUMMARY OF THE INVENTION

The present invention was made in view of the above and an object thereof is to provide an exhaust connection structure which achieves good sealability, facilitated construction, and decrease in number of parts and a combustion apparatus with an exhaust connection structure.

An exhaust connection structure according to the present invention is constructed to connect a combustion apparatus and an exhaust tube (a flexible exhaust tube) having projections and recesses in an outer surface, and includes a sealing member and an exhaust joint. The sealing member is arranged on an outer circumferential surface of the exhaust tube. The exhaust joint has an inner circumferential surface opposed to the outer circumferential surface of the exhaust tube and is arranged to sandwich the sealing member between the inner circumferential surface and the outer circumferential surface of the exhaust tube. The exhaust joint includes an engagement member. The engagement member has an annular portion and an engaging portion bent toward an inner circumference of the annular portion. The engaging portion is constructed to be engaged with the projections and recesses in the exhaust tube.

According to the exhaust connection structure in the present invention, the exhaust joint has the engaging portion for direct engagement with the projections and recesses in the outer circumferential surface of the exhaust tube. Therefore, need for a connection adapter interposed between the exhaust joint and the exhaust tube is obviated. Therefore, the number of parts can be reduced. Since the number of parts is reduced, construction for connecting the combustion apparatus and the exhaust tube with the exhaust connection structure being interposed is facilitated.

The sealing member is arranged between the outer circumferential surface of the exhaust tube and the inner circumferential surface of the exhaust joint. Therefore, leakage of an exhaust in the combustion apparatus from a portion of connection between the exhaust tube and the exhaust joint is suppressed. Good sealability can thus be obtained.

In the exhaust connection structure above, the exhaust joint further includes a joint body and a nut member. The joint body has a combustion apparatus connection portion for connection to the combustion apparatus and an exhaust tube connection portion for connection to the exhaust tube. The engagement member is attached to the joint body. The nut member has a screw portion screwed to the exhaust tube connection portion and a locking portion for preventing the engagement member from coming out of the joint body. There is a gap in which the engagement member increases in diameter with insertion of the exhaust tube between the outer circumferential surface of the engagement member and the inner circumferential surface of the nut member.

Thus, there is a gap between the outer circumferential surface of the engagement member and the inner circumferential surface of the nut member. Therefore, assembly of the engagement member increased in diameter as a result of insertion of the exhaust tube to the joint body and the nut member is facilitated.

By screwing the screw portion of the nut member to the exhaust tube connection portion, the nut member can readily be attached to the exhaust joint. With the nut member being attached to the exhaust joint, the locking portion of the nut member prevents the engagement member from coming out of the joint body. Therefore, the engagement member does not come out of the joint body in this state.

By unscrewing the nut member from the exhaust joint, the engagement member and the nut member can be removed from the joint body. Therefore, with the engagement member having been removed from the joint body, the exhaust tube can be inserted into the engagement member, and the engagement member in which the exhaust tube has been inserted can be attached to the joint body with the nut member. Therefore, connection of the exhaust tube to the exhaust connection structure is facilitated.

With the engagement member having been removed from the joint body, the exhaust tube can be inserted into the engagement member and the sealing member can be attached to the outer circumference of the exhaust tube. Therefore, attachment of the sealing member is also facilitated.

In the exhaust connection structure above, the sealing member is located between the outer circumferential surface of the exhaust tube and the inner circumferential surface of the exhaust tube connection portion and arranged closer to the combustion apparatus connection portion than the screw portion.

Thus, sealing with the sealing member is less likely to be affected by defective molding caused in molding of the screw portion. Therefore, sealability is further improved.

In the exhaust connection structure above, a distance between the sealing member and an opening end of the exhaust tube connection portion is equal to or greater than at least an inner diameter of the exhaust tube.

Thus, a distance over which the outer circumferential surface of the exhaust tube is opposed to the inner circumferential surface of the exhaust tube connection portion can be increased. Therefore, the exhaust tube is less likely to come out of the exhaust tube connection portion even when the exhaust tube is bent for installation at the time of installation of the exhaust connection structure.

In the exhaust connection structure above, the screw portion has a first threaded portion and a second threaded portion. The first threaded portion and the second threaded portion are separate from each other in a circumferential direction.

Thus, mold layout in molding of the nut member through resin molding is facilitated and molding of the nut member is facilitated.

In the exhaust connection structure above, the exhaust joint has a bent portion. The exhaust tube connection portion is located on one side of the bent portion and the combustion apparatus connection portion is located on the other side of the bent portion.

Since the exhaust tube connection portion is thus located on one side of the bent portion, an end portion of the exhaust tube opposed to the inner circumferential surface of the exhaust joint can be located before the bent portion. Since the exhaust tube can thus be installed not to be located in the bent portion, there is no influence by loss of a pressure caused when the exhaust tube is located in the bent portion.

In the exhaust connection structure above, an inner diameter of the exhaust joint at the bent portion is equal to an inner diameter of the exhaust joint at the exhaust tube connection portion at a portion of connection to the bent portion and an inner diameter of the exhaust joint at the combustion apparatus connection portion.

Thus, the inner diameter of the exhaust joint is not varied at the bent portion and portions before and after the bent portion. Therefore, fluctuation in resistance in a flow path for an exhaust which flows through the exhaust joint is suppressed.

In the exhaust connection structure above, an inner surface of the exhaust tube connection portion has a first surface located on a side of an opening end and a second surface located closer to the combustion apparatus connection portion than the first surface. In a cross-section in parallel to an axial line of the exhaust tube connection portion, each of the first surface and the second surface is inclined with respect to the axial line such that an inner diameter of the exhaust tube connection portion is smaller toward the combustion apparatus connection portion. An angle of inclination of the first surface with respect to the axial line is greater than an angle of inclination of the second surface with respect to the axial line.

Since the angle of inclination of the first surface on the side of the opening end is greater than the angle of inclination of the second surface, a diameter of the opening in the exhaust tube connection portion increases at a higher rate of change toward the opening end. Therefore, insertion of the exhaust tube into the exhaust tube connection portion is facilitated. The angle of inclination of the second surface close to the combustion apparatus connection portion is smaller than the angle of inclination of the first surface. Therefore, with insertion of the exhaust tube into a portion of the second surface toward the combustion apparatus connection portion, pressing force between the second surface and the sealing member gradually increases. Thus, as the exhaust tube is inserted toward the combustion apparatus connection portion, sealability is gradually improved.

In the exhaust connection structure above, a wall portion for abutment on an end portion of the exhaust tube is provided on an inner circumferential surface of the exhaust tube connection portion located closer to the combustion apparatus connection portion than the sealing member.

The wall portion functions as a stopper at which the exhaust tube abuts in insertion of the exhaust tube into the exhaust tube connection portion. Therefore, control of a length of insertion of the exhaust tube into the exhaust tube connection portion is easy and accuracy in construction is improved.

In the exhaust connection structure above, the projections and recesses in the sealing member have a first recess and a second recess and a projection located between the first recess and the second recess. The sealing member is fitted in the first recess and the second recess and abuts on the projection.

Leakage of the exhaust from between the sealing member and the outer circumferential surface of the exhaust tube is thus suppressed and sealability is improved.

In the exhaust connection structure above, the annular portion of the engagement member has a discontinuity. The discontinuity cuts the annular portion such that the annular portion is discontinuous in a circumferential direction.

Thus, in insertion of the exhaust tube into the annular portion of the engagement member, the annular portion readily increases in diameter. Therefore, insertion of the exhaust tube into the annular portion is facilitated.

A combustion apparatus with exhaust connection structure according to the present invention includes the exhaust connection structure described above and a combustion apparatus to which the exhaust connection structure is attached.

Since the combustion apparatus with exhaust connection structure according to the present invention includes the exhaust connection structure above, a combustion apparatus with exhaust connection structure which achieves good sealability, facilitated construction, and decrease in number of parts can be implemented.

In the combustion apparatus with exhaust connection structure above, the combustion apparatus is a water heating apparatus and the exhaust tube defines an emission path for an exhaust produced in the water heating apparatus.

Thus, the exhaust connection structure can be attached to the water heating apparatus with ensured good sealability, with simplified construction, and with decreased number of parts.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described below with reference to the drawings.

Figure 1:
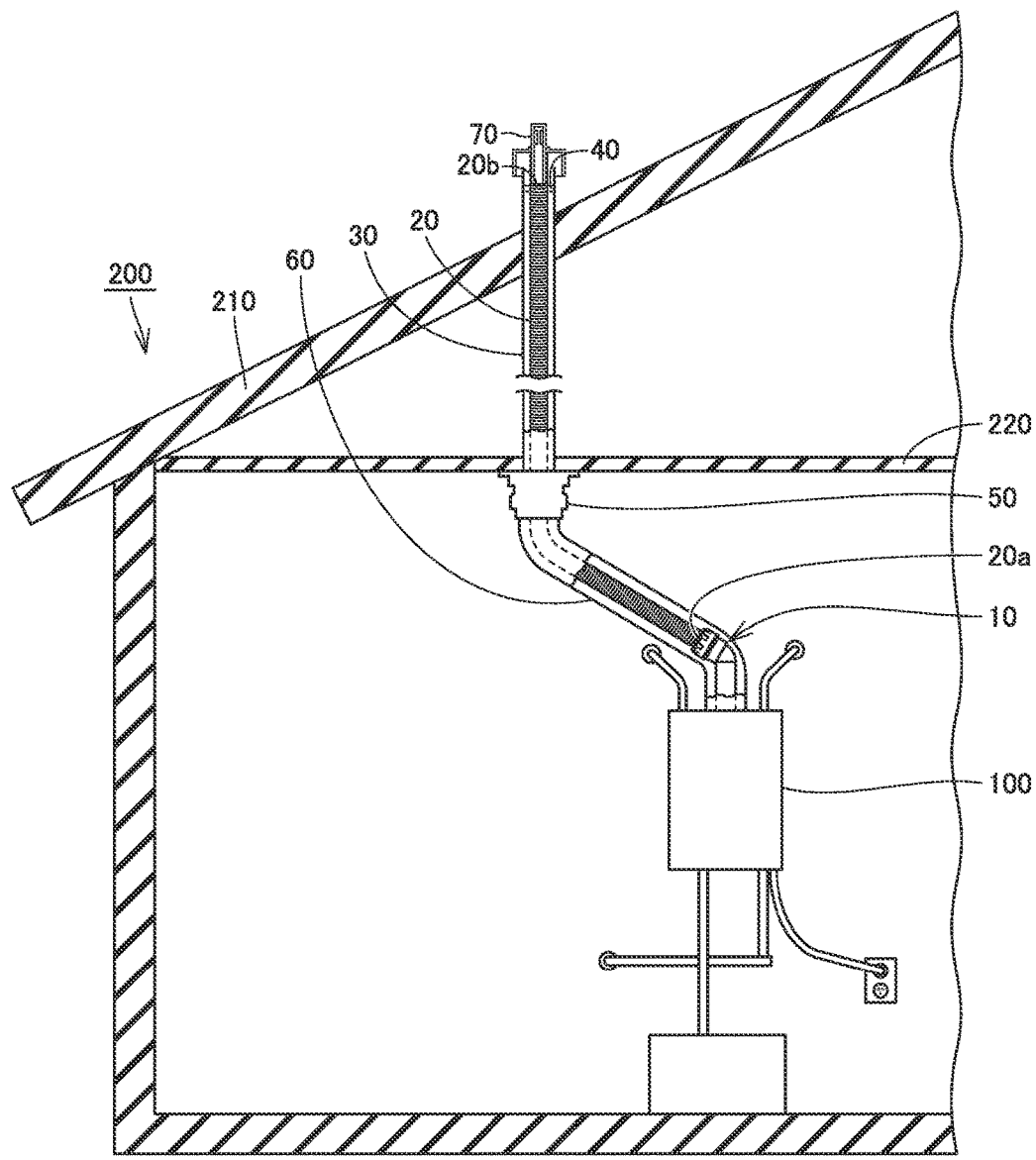
FIG. 1 is a schematic diagram showing a state that an exhaust connection structure in one embodiment of the present invention is connected to both of a combustion apparatus and an exhaust tube and installed in a building.

As shown in FIG. 1, an exhaust connection structure 10 in the present embodiment serves for connection to a combustion apparatus 100 and an exhaust tube (a flexible exhaust pipe (B vent)) 20.

Combustion apparatus 100 is installed indoors in a building 200. Though combustion apparatus 100 is, for example, a water heating apparatus which heats water with combustion gas, it may be another combustion apparatus such as a heating apparatus for heating the inside of a building with combustion gas. When the water heating apparatus is employed as combustion apparatus 100, the water heating apparatus may be, for example, a water heating apparatus of an exhaust suction and combustion type. Furthermore, the water heating apparatus may be a water heating apparatus of a latent heat recovery type.

Exhaust tube 20 has one end portion 20a and the other end portion 20b. Exhaust tube 20 is connected to exhaust connection structure 10 at one end portion 20a. The other end portion 20b of exhaust tube 20 extends to the outdoors. The inside of exhaust tube 20 is defined as an emission path for the combustion gas emitted from combustion apparatus 100. Thus, the combustion gas produced in combustion apparatus 100 can be guided to the outdoors through exhaust connection structure 10 and exhaust tube 20.

Though exhaust tube 20 is implemented as a flexible pipe such as an accordion pipe (a corrugated pipe having a wavy outer geometry), it may be a spiral pipe. Thus, a shape of the exhaust tube can conform also to an exhaust pipe 30 in a complicated shape. A material resistant to acid can suitably be adopted for exhaust tube 20 from a point of view of passage of an exhaust therethrough. This is because, when combustion apparatus 100 is the water heating apparatus of the latent heat recovery type as in the present embodiment, acidic drainage water may be discharged together with the exhaust.

A material resistant to acid such as a phenol resin, an epoxy resin, a silicone resin, a fluorine resin such as polytetrafluoroethylene, an unsaturated polyester resin, a melamine resin, a polycarbonate resin, a methacrylate styrene (MS) resin, a methacrylic resin, an AS resin (a styreneacrylonitrile copolymer), an ABS resin, polyethylene, polypropylene, polystyrene, polyethylene terephthalate (PET), and a vinyl chloride resin can be adopted as a material for exhaust tube 20.

Exhaust tube 20 connected to combustion apparatus 100 is held onto exhaust pipe 30 by an exhaust tube holding member (diffuser gasket) 40. Exhaust tube holding member 40 is preferably composed of a material resistant to acid. A material resistant to acid such as ethylene propylene rubber (EPDM), a phenol resin, an epoxy resin, a silicone resin, a fluorine resin such as polytetrafluoroethylene, an unsaturated polyester resin, a melamine resin, a polycarbonate resin, a methacrylate styrene (MS) resin, a methacrylic resin, an AS resin (a styrene-acrylonitrile copolymer), an ABS resin, polyethylene, polypropylene, polystyrene, polyethylene terephthalate (PET), and a vinyl chloride resin can be adopted as a material for exhaust tube holding member 40. Exhaust tube holding member 40 may be formed from a wire rod or a sheet metal.

Exhaust pipe 30 is attached to building 200 so as to extend from the indoors to the outdoors, for example, through a roof 210 of building 200. Exhaust pipe 30 may extend from the indoors to the outdoors through a wall. Exhaust pipe 30 is greater in outer diameter than exhaust tube 20. A part of exhaust tube 20 on a side of the other end portion 20b is inserted through exhaust pipe 30. Exhaust pipe 30 is formed, for example, of a metal. A cross-section of exhaust pipe 30 (a lateral cross-section: a cross-section along a surface orthogonal to an axial direction of exhaust pipe 30) is in a shape, for example, of a perfect circle, an ellipse, and an oval. Exhaust pipe 30 is connected to an exhaust tube fixing member 50 on a side of a lower end. Exhaust pipe 30 does not have to be connected to exhaust tube fixing member 50.

Exhaust tube fixing member 50 serves to fix a position of exhaust tube 20 to exhaust pipe 30. When exhaust tube fixing member 50 is connected to exhaust pipe 30, exhaust tube fixing member 50 serves to fix exhaust tube 20 to exhaust pipe 30. In the present embodiment, exhaust tube fixing member 50 is attached to exhaust pipe 30 on a side of combustion apparatus 100 relative to exhaust tube holding member 40. Exhaust tube fixing member 50 fixes connection piping 60 to exhaust pipe 30. Exhaust tube fixing member 50 is preferably fixed to a ceiling 220 of building 200 while it is fixed to both of exhaust tube 20 and exhaust pipe 30. Exhaust tube fixing member 50 is preferably composed of a material similar to that for exhaust tube 20.

A rain cap (an exhaust terminal) 70 is attached to the other end portion 20b of exhaust tube 20. Rain cap 70 has an exhaust vent. With this exhaust vent, combustion gas guided through exhaust tube 20 can be exhausted to the outside of building 200 from rain cap 70.

Connection piping 60 serves to protect exhaust tube 20 by covering exhaust tube 20. Connection piping 60 is connected to exhaust tube fixing member 50 and combustion apparatus 100. Connection piping 60 is greater in outer diameter than exhaust tube 20. A part of exhaust tube 20 on a side of one end portion 20a is inserted through connection piping 60.

Though connection piping 60 is implemented as a flexible pipe such as an accordion pipe, it may be a spiral pipe. With connection piping 60 being flexible, connection piping 60 can readily conform to a shape of exhaust tube 20. Furthermore, connection between connection piping 60 and water heating apparatus 100 is facilitated.

Connection piping 60 may be, for example, a pipe made of aluminum. Since connection piping 60 can be light in weight in this case, load imposed on exhaust tube fixing member 50 which supports connection piping 60 can be lessened. When connection piping 60 is made of aluminum, it also has some hardness and hence deformation due to a self weight of connection piping 60 can be suppressed. Since working such as cutting of a pipe made of aluminum is relatively easy, such a pipe can readily be adapted to a length, for example, of exhaust tube 20.

Figure 2:
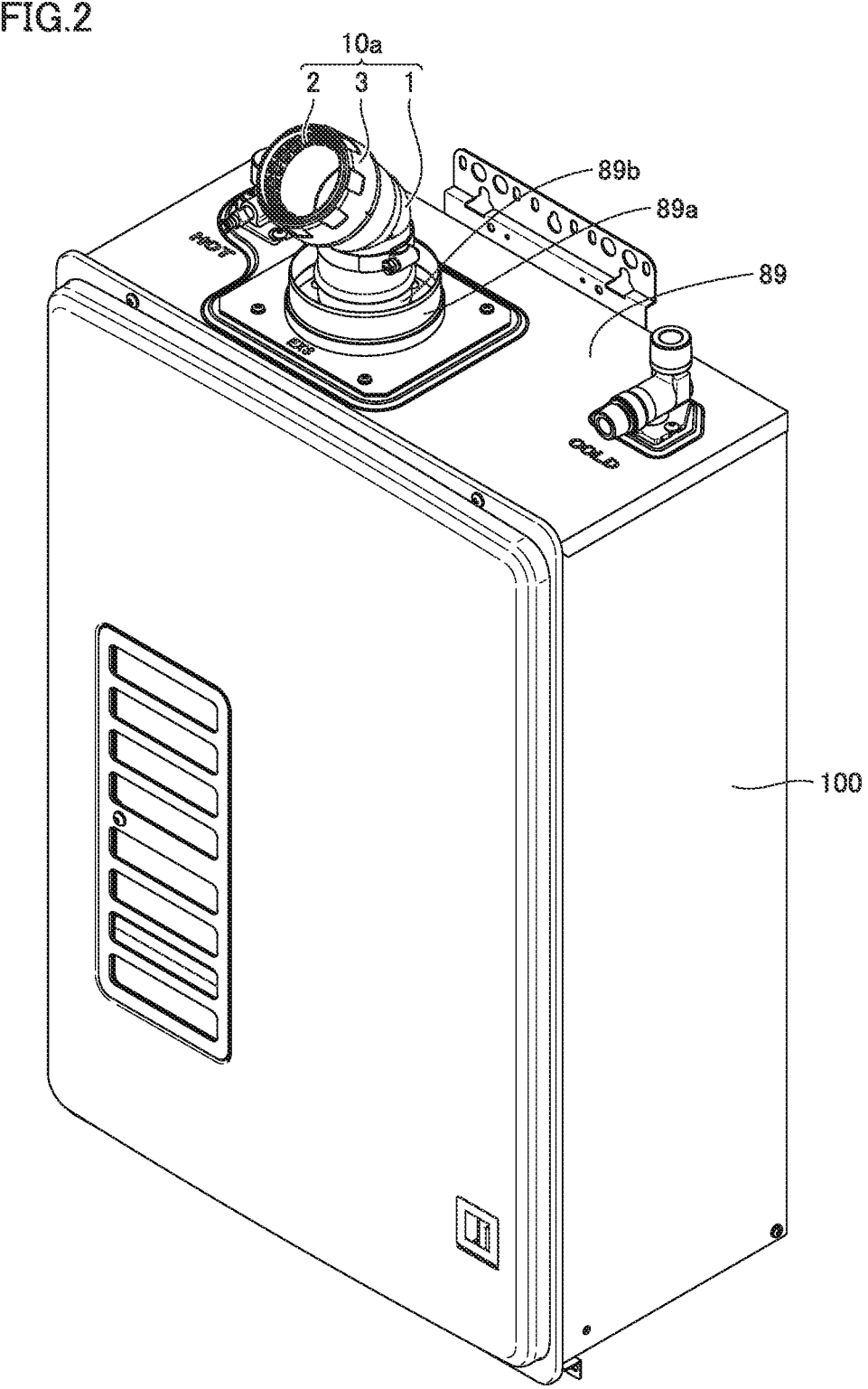
FIG. 2 is a perspective view showing a state that an exhaust joint included in the exhaust connection structure in one embodiment of the present invention is attached to the combustion apparatus.

As shown in FIG. 2, exhaust connection structure 10 is connected to combustion apparatus 100. Specifically, a joint body 1 of an exhaust joint 10a is connected to an exhaust portion 89b of combustion apparatus 100. Connection piping 60 shown in FIG. 1 is connected to a connection portion 89a of combustion apparatus 100.

A construction of each portion in exhaust connection structure 10 in the present embodiment will now be described with reference to FIGS. 3 to 7.

Figure 3:
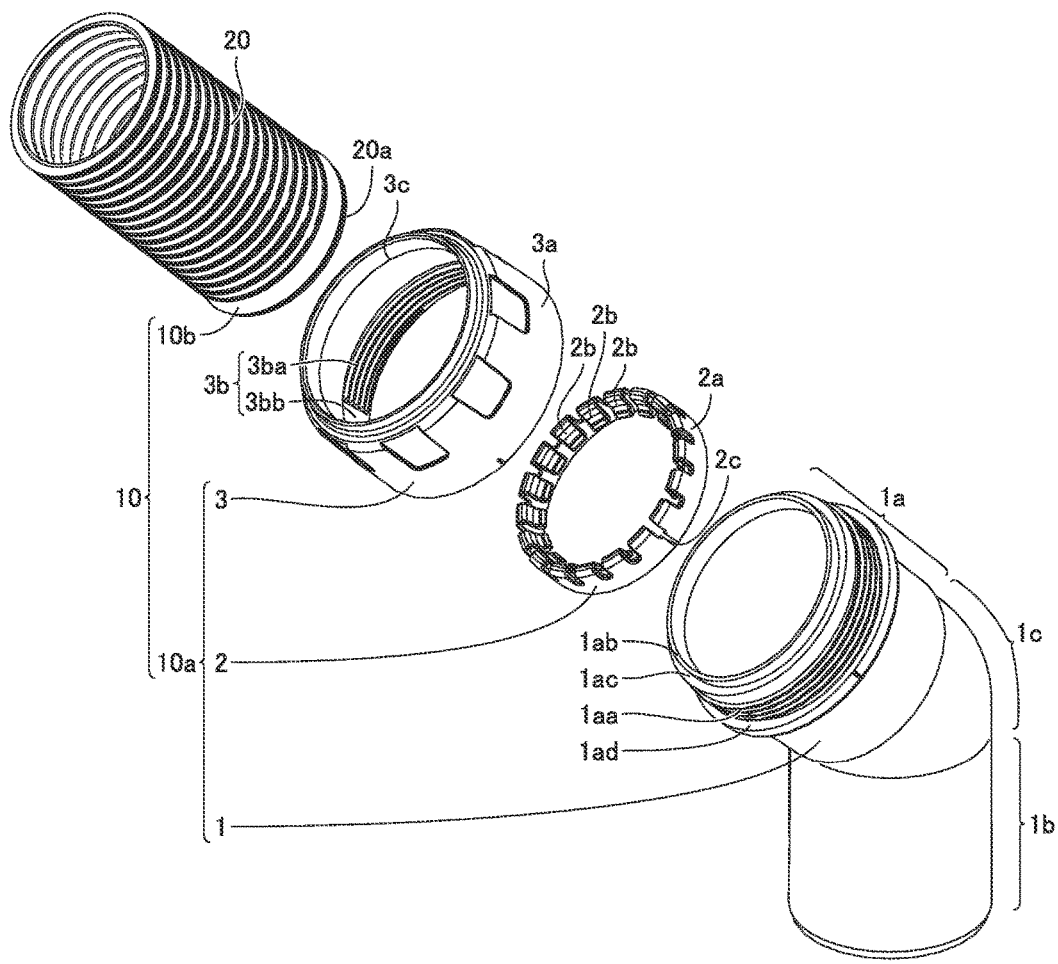
FIG. 3 is an exploded perspective view showing a construction of the exhaust connection structure and the exhaust tube in one embodiment of the present invention.

As shown in FIG. 3, exhaust connection structure 10 in the present embodiment has exhaust joint 10a and a sealing member 10b. Exhaust joint 10a has joint body 1, an engagement member 2, and a nut member 3.

Joint body 1 is a pipe, and it has, for example, an exhaust tube connection portion 1a, a combustion apparatus connection portion 1b, and a bent portion 1c. Exhaust tube connection portion 1a is a portion for connection to exhaust tube 20. Combustion apparatus connection portion 1b is a portion for connection to combustion apparatus 100. Each of exhaust tube connection portion 1a and combustion apparatus connection portion 1b is in a substantially cylindrical shape and linearly extends. Bent portion 1c is located between exhaust tube connection portion 1a and combustion apparatus connection portion 1b and connected to each of exhaust tube connection portion 1a and combustion apparatus connection portion 1b. Exhaust tube connection portion 1a is located on one side of bent portion 1c and combustion apparatus connection portion 1b is located on the other side of bent portion 1c. With the presence of bent portion 1c, a direction of extension of exhaust tube connection portion 1a and a direction of extension of combustion apparatus connection portion 1b form an angle, for example, of 45° therebetween.

Exhaust tube connection portion 1a has a screw portion 1aa, an annular support portion 1ab, an annular surface 1ac, and a flange portion 1ad on an outer circumferential surface. Annular support portion 1ab is in an annular shape and located at an opening end of exhaust tube connection portion 1a. Annular support portion 1ab is a portion for supporting engagement member 2.

Annular surface 1ac is arranged at a position closer to combustion apparatus connection portion 1b than annular support portion 1ab. Annular surface 1ac protrudes in a direction of an outer circumference of exhaust tube connection portion 1a relative to annular support portion 1ab. Annular surface 1ac is located on a surface intersecting with an axial line of exhaust tube connection portion 1a. Annular surface 1ac annularly surrounds the entire circumference around the axial line of exhaust tube connection portion 1a. Annular surface 1ac is a portion for receiving an end portion of engagement member 2.

Screw portion 1aa is arranged at a position closer to combustion apparatus connection portion 1b than annular surface 1c. Screw portion 1aa is a male screw and a portion for screwing to a screw portion of nut member 3.

Flange portion 1ad is arranged at a position closer to combustion apparatus connection portion 1b than screw portion 1aa. Flange portion 1ad protrudes in the direction of the outer circumference relative to an outermost circumferential portion of screw portion 1aa. Flange portion 1ad is a portion for receiving an end portion of nut member 3.

Engagement member 2 has an annular portion 2a and an engaging portion 2b. Annular portion 2a is in an annular shape. Annular portion 2a is a portion for fitting to an outer circumference of annular support portion 1ab in exhaust tube connection portion 1a. A discontinuity 2c is provided in annular portion 2a. Discontinuity 2c cuts annular portion 2a such that annular portion 2a is discontinuous in a circumferential direction.

Engaging portion 2b is connected to annular portion 2a. Engaging portion 2b is in such a shape as protruding from annular portion 2a in the axial direction of annular portion 2a, thereafter bent toward an inner circumference of annular portion 2a, and further folded back in the axial direction. Engaging portion 2b is substantially in a U shape in a cross-section in parallel to the axial line of annular portion 2a. A surface on an inner circumferential side of a portion folded back toward the inner circumference of engaging portion 2b is formed as a surface connected at a smooth curvature. Therefore, a projecting or recessed corner portion is not formed in the surface on the inner circumferential side of the portion folded back toward the inner circumference of engaging portion 2b. Engaging portion 2b is a portion for engagement with projections and recesses in exhaust tube 20.

Nut member 3 has a cylindrical portion 3a, a screw portion 3b, and a locking portion 3c. Cylindrical portion 3a is, for example, in a cylindrical shape. Screw portion 3b is formed on an inner circumferential surface of cylindrical portion 3a. Locking portion 3c is arranged at a tip end of cylindrical portion 3a and is in an annular shape. Locking portion 3c protrudes toward the inner circumference relative to the inner circumferential surface of cylindrical portion 3a. Therefore, locking portion 3c is smaller in inner diameter than cylindrical portion 3a.

Figure 4:
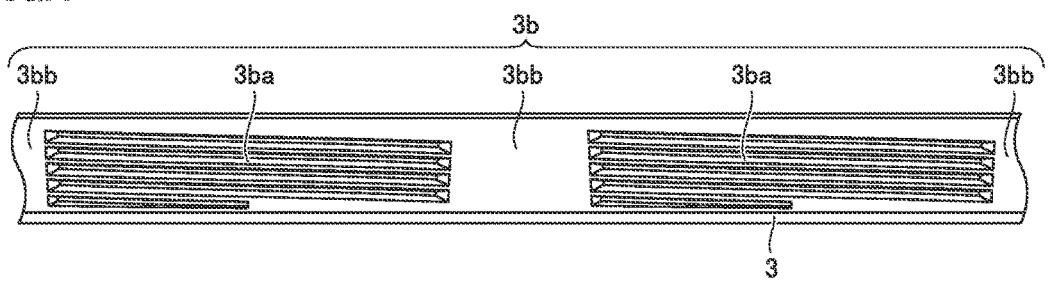
FIG. 4 is a developed view showing a screw portion formed in an inner circumferential surface of a nut member included in the exhaust connection structure in one embodiment of the present invention.

As shown in FIG. 4, screw portion 3b of nut member 3 has a plurality of threaded portions 3ba which are separate from each other. Screw portion 3b has two threaded portions of a first threaded portion 3ba on the left in the figure and a second threaded portion 3ba on the right in the figure. First threaded portion 3ba and second threaded portion 3ba are separate from each other in the circumferential direction with an unthreaded region 3bb lying therebetween.

As shown in FIG. 3, sealing member 10b is attached to the outer circumferential surface of exhaust tube 20. Sealing member 10b can hermetically seal a gap between exhaust tube 20 and exhaust joint 10a. Thus, leakage of the exhaust which flows in exhaust joint 10a from between exhaust tube 20 and exhaust joint 10a to the outside can be suppressed.

Figure 5:
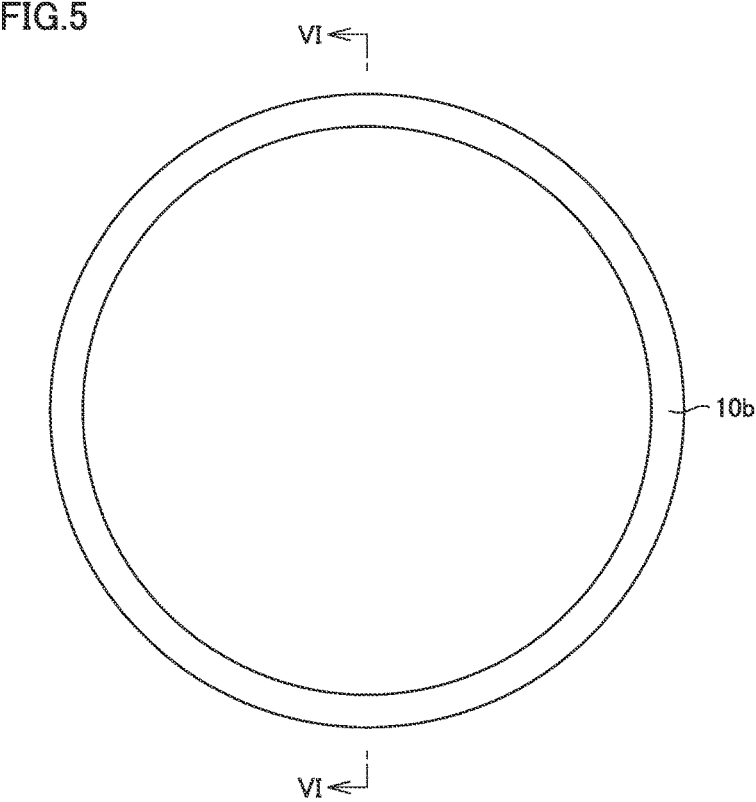
FIG. 5 is a diagram showing a construction of a sealing member included in the exhaust connection structure in one embodiment of the present invention.
Figure 6:
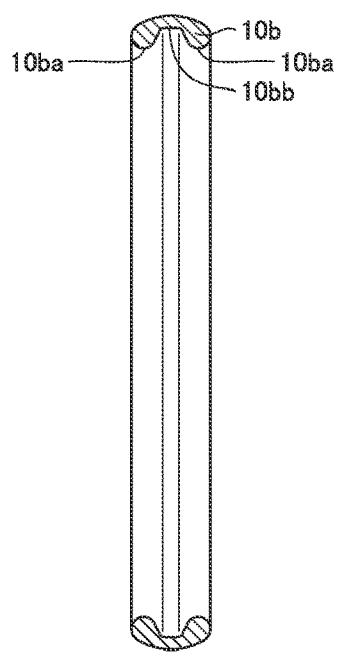
FIG. 6 is a cross-sectional view along the line VI-VI in FIG. 5.

As shown in FIG. 5, sealing member 10b is in a circular shape. As shown in FIG. 6, in a cross-section perpendicular to the circumferential direction of sealing member 10b, the outer circumferential surface of sealing member 10b is in a round shape. The round shape of sealing member 10b on the side of the outer circumferential surface is such that a central portion thereof protrudes toward the outer circumference relative to opposing end portions. In the cross-section perpendicular to the circumferential direction of sealing member 10*b*, the inner circumferential surface of sealing member 10*b* has a depression portion in a central portion 10*bb* and has protruding portions at opposing end portions 10*ba*. Central portion 10*bb* is depressed toward the outer circumference relative to opposing end portions 10*ba*. Opposing end portions 10*ba* protrude toward the inner circumference relative to central portion 10*bb*.

Figure 7:
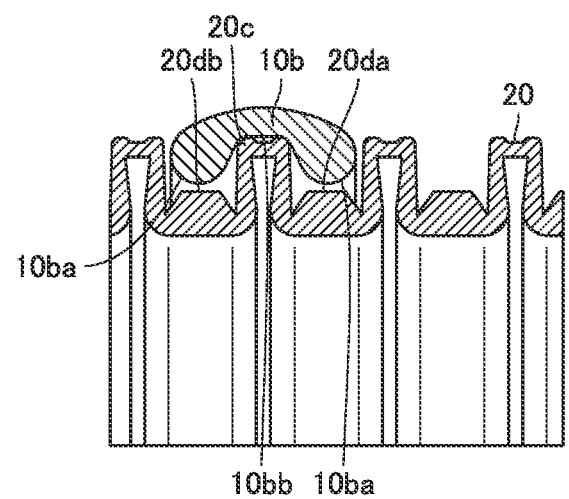
FIG. 7 is a partial cross-sectional view showing a state that the sealing member included in the exhaust connection structure in one embodiment of the present invention is attached to an outer circumferential surface of the exhaust tube.

As shown in FIG. 7, the projections and recesses in the outer circumferential surface of exhaust tube 20 have a first recess 20*da*, a projection 20*c*, and a second recess 20*db*. Projection 20*c* lies between first recess 20*da* and second recess 20*db*. Sealing member 10*b* is arranged to cover an outer periphery of each of first recess 20*da*, projection 20*c*, and second recess 20*db* in the projections and recesses in the outer circumferential surface of exhaust tube 20. Specifically, the protruding portions of opposing ends portions 10*ba* of sealing member 10*b* are fitted into first and second recesses 20*da* and 20*db* in the outer circumferential surface of exhaust tube 20, respectively. The depression portion in central portion 10*bb* of sealing member 10*b* abuts on projection 20*c* on the outer circumferential surface of exhaust tube 20.

A state of assembly of exhaust connection structure 10 in the present embodiment and a state of connection of exhaust connection structure 10 to exhaust tube 20 will now be described with reference to FIGS. 8 to 10.

Figure 8:
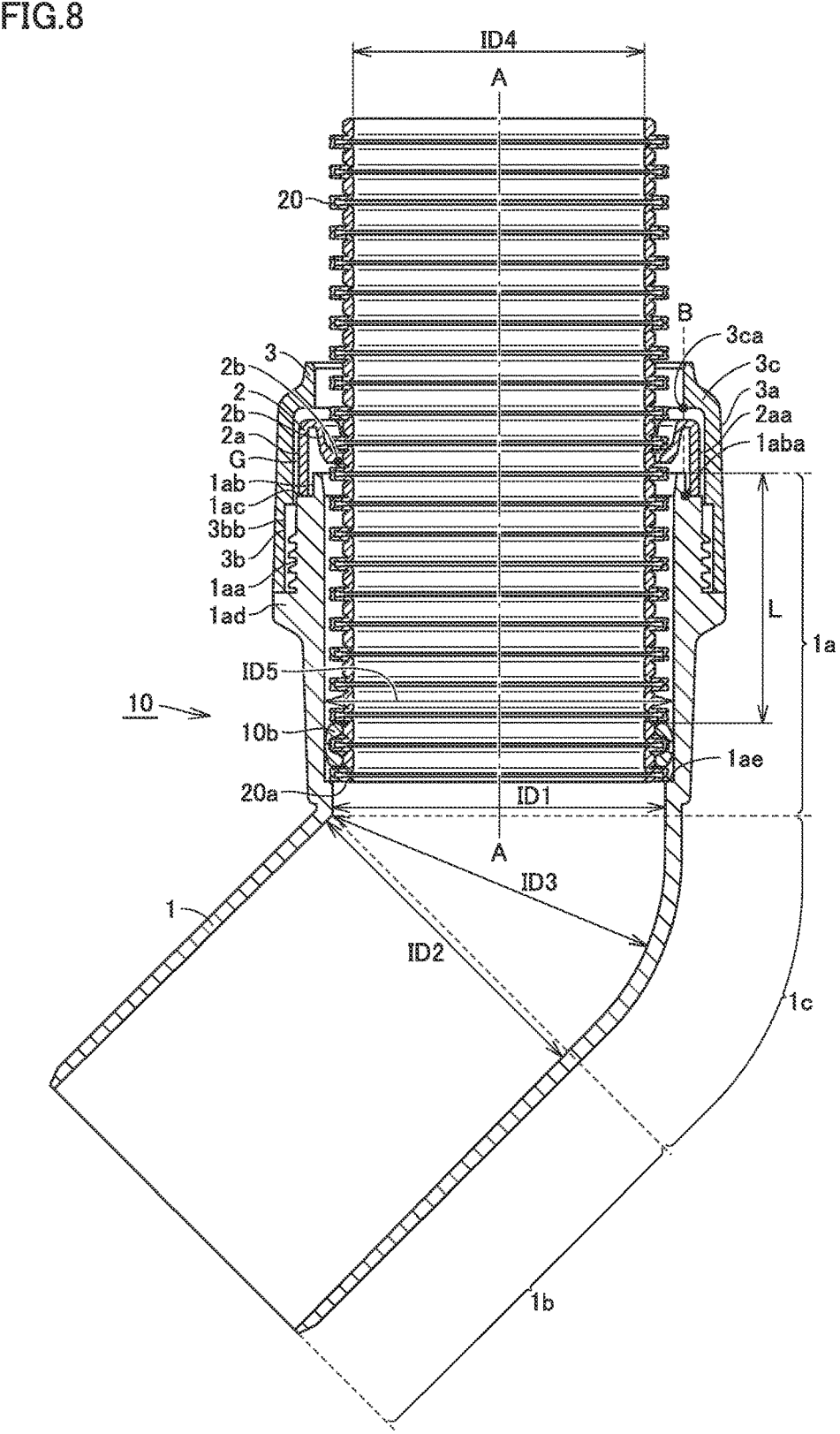
FIG. 8 is a cross-sectional view showing a construction of the exhaust connection structure and the exhaust tube in one embodiment of the present invention.

As shown in FIG. 8, with exhaust connection structure 10 in the present embodiment being assembled, engagement member 2 is fitted to the outer circumference of annular support portion 1*ab* of joint body 1. The end portion of engagement member 2 abuts on annular surface 1*ac* of joint body 1.

Nut member 3 is attached to joint body 1. Nut member 3 is attached to joint body 1 by screwing threaded portion 3*ba* (FIG. 4) of nut member 3 to screw portion 1*aa* of joint body 1. The end portion of nut member 3 abuts on flange portion 1*ad* of joint body 1.

With nut member 3 being attached to joint body 1, engagement member 2 is located between annular surface 1*ac* of joint body 1 and locking portion 3*c* of nut member 3. Engagement member 2 is thus prevented from coming out of joint body 1. Specifically, an innermost circumferential portion 3*ca* of locking portion 3*c* is located on the inner circumferential side relative to an outermost circumferential portion 1*aba* of annular support portion 1*ab*, or at a position the same as that in a direction of extension of an axial line A. Namely, outermost circumferential portion 1*aba* of annular support portion 1*ab* is located on a virtual line B which passes through innermost circumferential portion 3*ca* of locking portion 3*c*, or located on the outer circumferential side relative to virtual line B. Therefore, engagement member 2 fitted to the outer circumference of annular support portion 1*ab* has a portion located on the outer circumferential side relative to innermost circumferential portion 3*ca* of locking portion 3*c*. Engagement member 2 thus does not come out of an opening portion in locking portion 3*c* of nut member 3.

An innermost circumferential portion of engaging portion 2*b* of engagement member 2 is located on the inner circumferential side relative to the inner circumferential surface of exhaust tube connection portion 1*a*. A gap G is provided between the outer circumferential surface of engagement member 2 and the inner circumferential surface of nut member 3. A distance between the inner circumferential surface of nut member 3 and the outer circumferential surface of annular support portion 1*ab* is set to be greater than a thickness of annular portion 2*a* of engagement member 2. Thus, engagement member 2 can increase in diameter in a space between the inner circumferential surface of nut member 3 and the outer circumferential surface of annular support portion 1*ab*.

An inner diameter ID3 of exhaust joint 10*a* at bent portion 1*c* is equal to an inner diameter ID1 of exhaust joint 10*a* at exhaust tube connection portion 1*a* at a portion of connection to the bent portion and an inner diameter ID2 of exhaust joint 10*a* at combustion apparatus connection portion 1*b*. Inner diameter ID3 is maintained in entire bent portion 1*c*. Inner diameter ID2 is maintained in entire combustion apparatus connection portion 1*b*.

With exhaust tube 20 being connected to exhaust connection structure 10, one end portion 20*a* of exhaust tube 20 is inserted in exhaust joint 10*a*. In this state, the outer circumferential surface of exhaust tube 20 is opposed to the inner circumferential surface of exhaust joint 10*a*. Sealing member 10*b* is sandwiched between the outer circumferential surface of exhaust tube 20 and the inner circumferential surface of exhaust joint 10*a* which are opposed to each other. The inner circumferential surface of sealing member 10*b* abuts on the outer circumferential surface of exhaust tube 20 and the outer circumferential surface of sealing member 10*b* abuts on the inner circumferential surface of exhaust joint 10*a*.

Sealing member 10*b* is arranged closer to combustion apparatus connection portion 1*b* than screw portion 3*b* of nut member 3 or screw portion 1*aa* of exhaust tube connection portion 1*a*. A distance L between sealing member 10*b* and the opening end of exhaust tube connection portion 1*a* is equal to or greater than an inner diameter ID4 of exhaust tube 20. A wall portion 1*ae* is provided on the inner circumferential surface of exhaust tube connection portion 1*a* located closer to combustion apparatus connection portion 1*b* than sealing member 10*b*. Wall portion 1*ae* abuts on one end portion 20*a* of exhaust tube 20.

Exhaust tube 20 is inserted in engagement member 2 so as to pass through engagement member 2. With exhaust tube 20 having been inserted in engagement member 2, engaging portion 2*b* of engagement member 2 is fitted into the recess in the projections and recesses at an outer main surface of exhaust tube 20. When exhaust tube 20 is inserted in engagement member 2 so as to pass through engagement member 2, engagement member 2 increases in diameter with discontinuity 2*c* being widened (FIG. 3). Specifically, engagement member 2 increases in diameter as shown in FIGS. 9 and 10.

Figure 9:
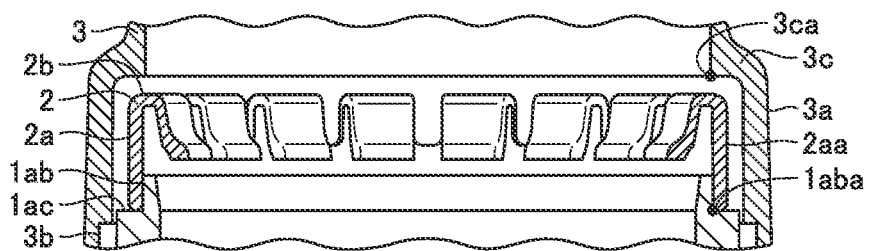
FIG. 9 is a partial cross-sectional view showing a state that the exhaust tube is not inserted in an engagement member included in the exhaust connection structure in one embodiment of the present invention.

As shown in FIG. 9, for example, while exhaust tube 20 is not inserted in engagement member 2, the inner circumferential surface of engagement member 2 is set to abut on the outer circumferential surface of annular support portion 1*ab* of exhaust joint 10*a*. When exhaust tube 20 is inserted in engagement member 2 in this state, as shown in FIG. 10, engagement member 2 increases in diameter such that the inner circumferential surface of engagement member 2 moves away from the outer circumferential surface of annular support portion 1*ab* so as to move toward the outer circumference.

A method of connecting and disconnecting exhaust connection structure 10 and exhaust tube 20 to and from each other will now be described with reference to FIGS. 3 and 8.

As shown in FIGS. 3 and 8, initially, exhaust tube 20 is inserted in nut member 3 so as to pass through nut member 3. Thereafter, exhaust tube 20 is inserted in engagement member 2 so as to pass through engagement member 2. As a result of insertion of exhaust tube 20, engagement member 2 increases in diameter. Thereafter, sealing member 10*b* is attached to the outer circumferential surface of exhaust tube 20. Thus, the opposing end portions of the inner circumferential surface of sealing member 10*b* cover the recesses in the outer circumferential surface of exhaust tube 20 and the central portion of the inner circumferential surface of sealing member 10*b* covers the projection on the outer circumferential surface of exhaust tube 20.

In this state, one end portion 20*a* of exhaust tube 20 is inserted into exhaust tube connection portion 1*a* of joint body 1. Exhaust tube 20 is inserted in exhaust tube connection portion 1*a* until one end portion 20*a* of exhaust tube 20 abuts on wall portion 1*ae* located on the inner circumferential surface of exhaust tube connection portion 1*a*. Thereafter, screw portion 3*b* of nut member 3 is screwed to screw portion 1*aa* of joint body 1. Nut member 3 is thus attached and fixed to joint body 1. Exhaust tube 20 is thus connected to exhaust connection structure 10.

In order to remove exhaust tube 20 from exhaust connection structure 10, initially, nut member 3 is unscrewed from joint body 1. Thereafter, exhaust tube 20 is removed from exhaust connection structure 10 by performing operations in an order opposite to the connection method above.

A modification of joint body 1 will now be described with reference to FIG. 11.

Figure 11:
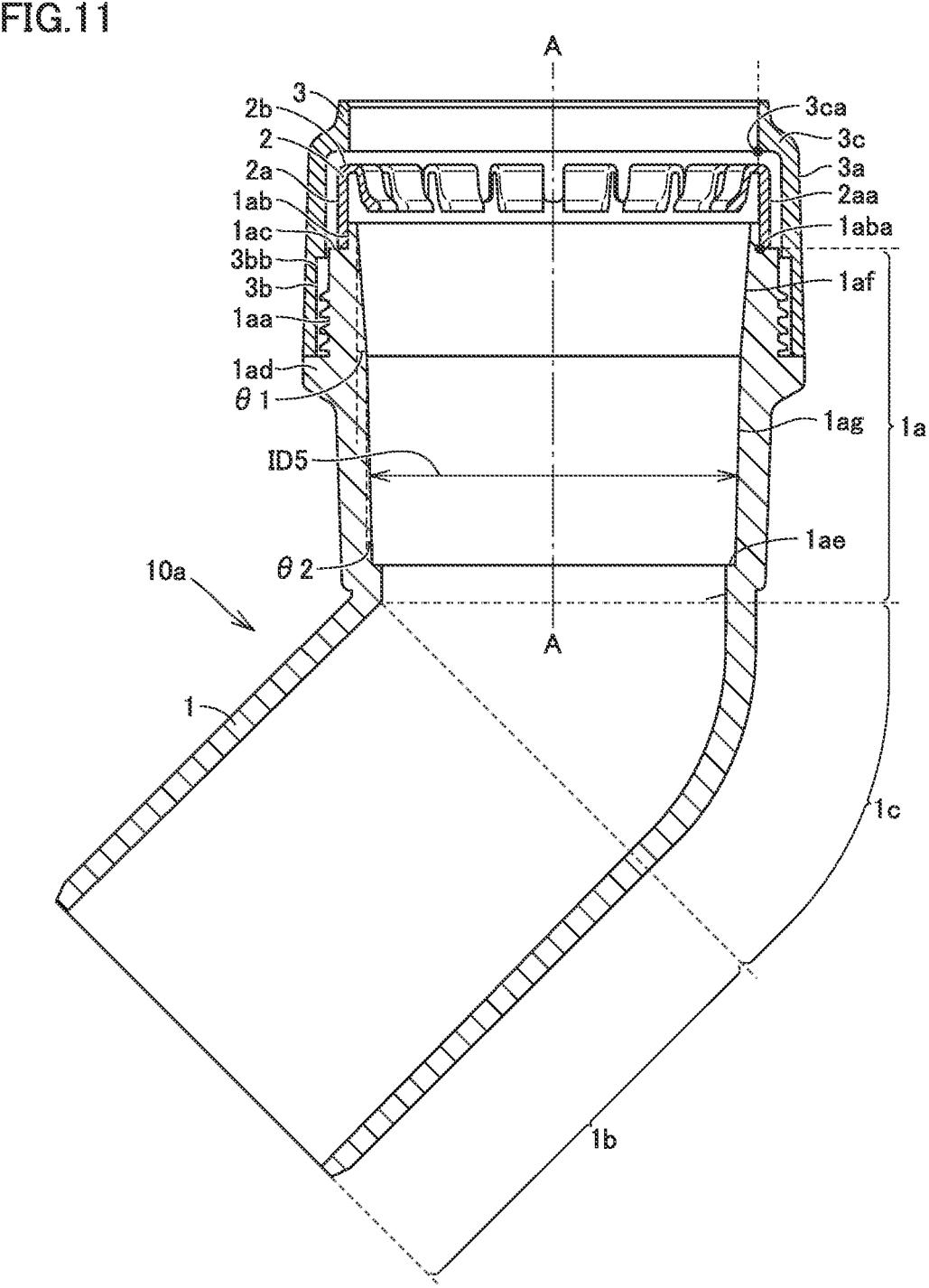
FIG. 11 is a cross-sectional view showing a construction of a modification in which an inner circumferential surface of a joint body included in the exhaust connection structure in one embodiment of the present invention is inclined in two stages.

As shown in FIG. 11, the inner circumferential surface of exhaust tube connection portion 1*a* of joint body 1 has a first surface 1*af* and a second surface 1*ag*. First surface 1*af* is located on the side of the opening end of exhaust tube connection portion 1*a*. Second surface 1*ag* is located closer to combustion apparatus connection portion 1*b* than first surface 1*af*. In a cross-section in parallel to axial line A of exhaust tube connection portion 1*a*, each of first surface 1*af* and second surface 1*ag* is inclined with respect to axial line A such that an inner diameter of exhaust tube connection portion 1*a* is smaller toward combustion apparatus connection portion 1*b*. An angle of inclination θ1 of first surface 1*af* with respect to axial line A is greater than an angle of inclination θ2 of second surface 1*ag* with respect to axial line A.

Since features of exhaust joint 10*a* other than the above shown in FIG. 11 are substantially the same as features of exhaust joint 10*a* shown in FIGS. 3 to 10, the same elements have the same reference numerals allotted and description thereof will not be repeated.

A construction of combustion apparatus 100 connected to exhaust tube 20 with exhaust connection structure 10 above will now be described with reference to FIGS. 12 and 13.

Combustion apparatus 100 connected to exhaust tube 20 with exhaust connection structure 10 above may be, for example, a water heating apparatus of a latent heat recovery type adapted to an exhaust suction and combustion system as described above. A water heating apparatus of a latent heat recovery type adapted to an exhaust suction and combustion system will be described below as one example of combustion apparatus 100.

Figure 12:
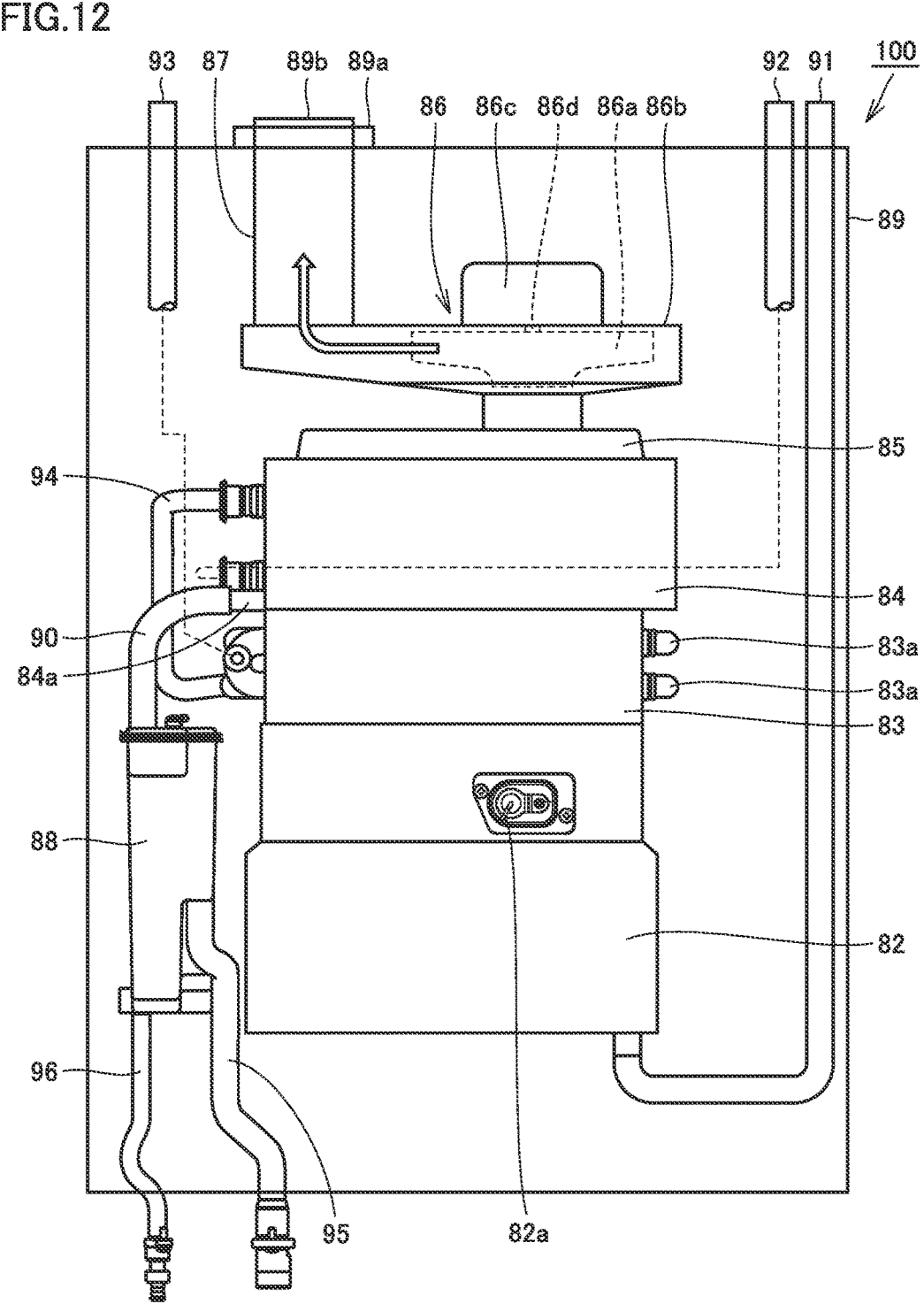
FIG. 12 is a front view showing a construction of a water heating apparatus representing one example of the combustion apparatus to which the exhaust connection structure in one embodiment of the present invention is connected.
Figure 13:
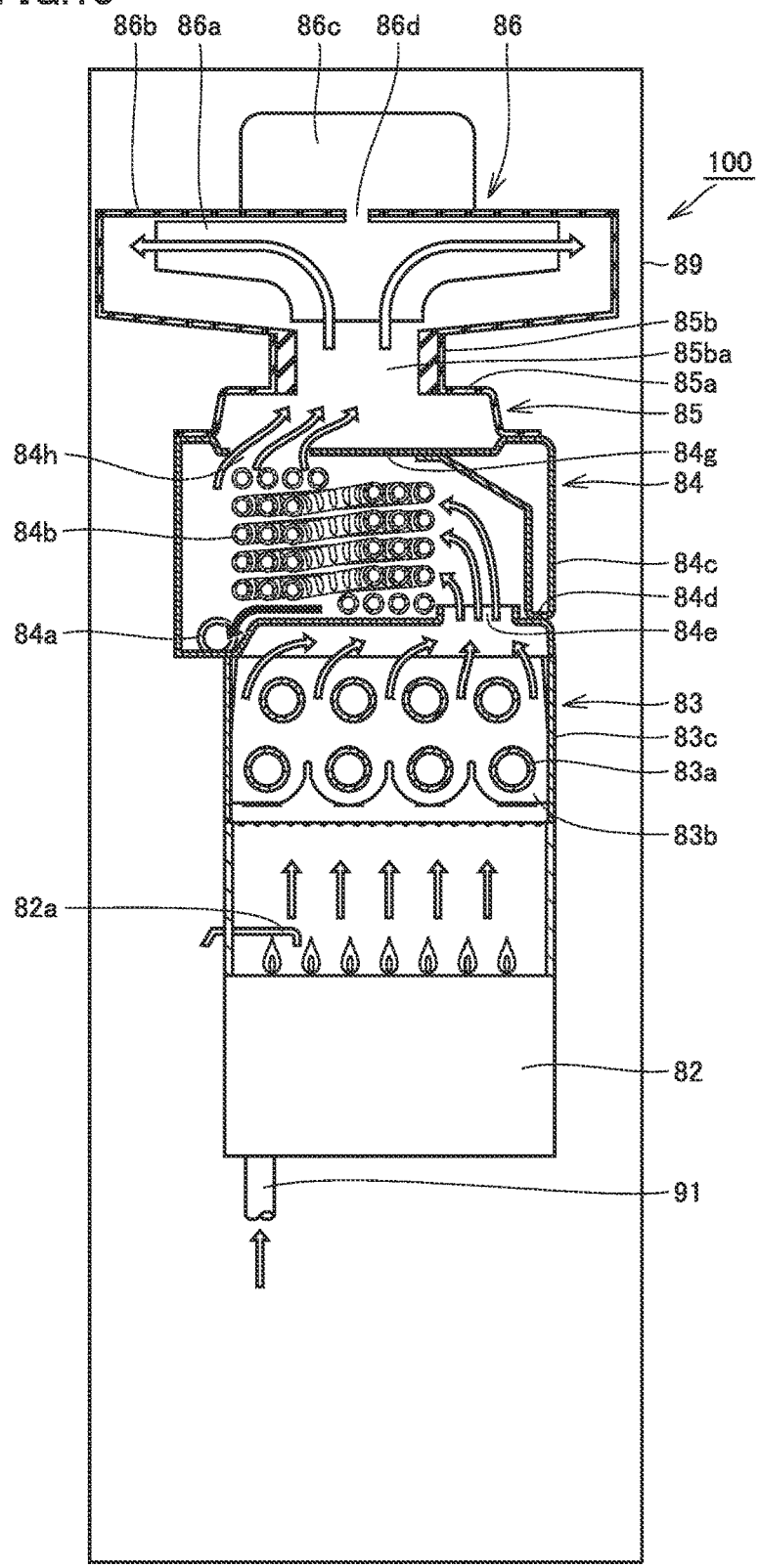
FIG. 13 is a partial side cross-sectional view schematically showing a construction of the water heating apparatus shown in FIG. 12.

As shown in FIGS. 12 and 13, water heating apparatus 100 mainly has a burner 82, a primary heat exchanger 83, a secondary heat exchanger 84, an exhaust box 85, a fan 86, a connection pipe 87, a drainage water tank 88, a housing 89, and pipes 90 to 96.

Burner 82 serves to produce combustion gas by burning fuel gas. A gas supply pipe 91 is connected to burner 82. This gas supply pipe 91 serves to supply fuel gas to burner 82. A gas valve (not shown) implemented, for example, by an electromagnetic valve is attached to this gas supply pipe 91.

A spark plug 82*a* is arranged above burner 82. This spark plug 82*a* serves to ignite an air fuel mixture injected from burner 82 to thereby produce a flame, by generating sparks between the plug and a target (not shown) provided in burner 82 by activating an ignition device (an igniter). Burner 82 generates a quantity of heat by burning fuel gas supplied from gas supply pipe 91 (which is called a combustion operation).

Primary heat exchanger 83 is a heat exchanger of a sensible heat recovery type. This primary heat exchanger 83 mainly has a plurality of plate-shaped fins 83*b*, a heat conduction pipe 83*a* penetrating the plurality of plate-shaped fins 83*b*, and a case 83*c* accommodating fins 83*b* and heat conduction pipe 83*a*. Primary heat exchanger 83 exchanges heat with the combustion gas generated by burner 82, and specifically, it serves to heat water which flows through heat conduction pipe 83*a* of primary heat exchanger 83 with the quantity of heat generated as a result of the combustion operation of burner 82.

Secondary heat exchanger 84 is a heat exchanger of a latent heat recovery type. This secondary heat exchanger 84 is located downstream of primary heat exchanger 83 in a flow of the combustion gas and connected in series with primary heat exchanger 83. Since water heating apparatus 100 according to the present embodiment thus has secondary heat exchanger 84 of a latent heat recovery type, it is water heating apparatus 100 of the latent heat recovery type.

Secondary heat exchanger 84 mainly has a drainage water discharge port 84*a*, a heat conduction pipe 84*b*, a sidewall 84*c*, a bottom wall 84*d*, and an upper wall 84*g*. Heat conduction pipe 84*b* is layered as it is spirally wound. Sidewall 84*c*, bottom wall 84*d*, and upper wall 84*g* are arranged to surround heat conduction pipe 84*b*.

In secondary heat exchanger 84, water which flows through heat conduction pipe 84*b* is pre-heated (heated) through heat exchange with the combustion gas of which heat has been exchanged in primary heat exchanger 83. As a temperature of the combustion gas is lowered to approximately 60° C. through this process, moisture contained in the combustion gas is condensed so that latent heat can be obtained. In addition, latent heat is recovered in secondary heat exchanger 84 and moisture contained in the combustion gas is condensed, whereby drainage water is produced.

Bottom wall 84*d* serves as a partition between primary heat exchanger 83 and secondary heat exchanger 84, and it also serves as an upper wall of primary heat exchanger 83. This bottom wall 84*d* is provided with an opening portion 84*e*. This opening portion 84*e* allows communication between a space where heat conduction pipe 83*a* of primary heat exchanger 83 is arranged and a space where heat conduction pipe 84*b* of secondary heat exchanger 84 is arranged. As shown with hollow arrows in FIG. 13, the combustion gas can flow from primary heat exchanger 83 to secondary heat exchanger 84 through opening portion 84*e*. In this embodiment, for the sake of simplification, bottom wall 84*d* of secondary heat exchanger 84 and the upper wall of primary heat exchanger 83 are common, however, an exhaust collection and guide member may be connected between primary heat exchanger 83 and secondary heat exchanger 84.

Upper wall 84*g* is provided with an opening portion 84*h*, and this opening portion 84*h* allows communication between the space where heat conduction pipe 84*b* of secondary heat exchanger 84 is arranged and an internal space in exhaust box 85. As shown with hollow arrows in FIG. 13, the combustion gas can flow from secondary heat exchanger 84 into the internal space in exhaust box 85 through opening portion 84h.

Drainage water discharge port 84a is provided in sidewall 84c or bottom wall 84d. This drainage water discharge port 84a opens at a lowest position in the space surrounded by side wall 84c, bottom wall 84d, and upper wall 84g (a lowermost position in a vertical direction in a state of placement of the water heating apparatus), which is lower than a lowermost portion of heat conduction pipe 84b. Thus, drainage water produced in secondary heat exchanger 84 can be guided to drainage water discharge port 84a along bottom wall 84d and sidewall 84c as shown with a black arrow in FIG. 13.

Exhaust box 85 forms a path for a flow of the combustion gas between secondary heat exchanger 84 and fan 86. This exhaust box 85 can guide the combustion gas of which heat has been exchanged in secondary heat exchanger 84 to fan 86. Exhaust box 85 is attached to secondary heat exchanger 84 and located downstream of secondary heat exchanger 84 in the flow of the combustion gas.

Exhaust box 85 mainly has a box main body 85a and a fan connection portion 85b. An internal space in box main body 85a communicates with the internal space where heat conduction pipe 84b of secondary heat exchanger 84 is arranged through opening portion 84h in secondary heat exchanger 84. Fan connection portion 85b is provided so as to protrude from an upper portion of box main body 85a. This fan connection portion 85b has, for example, a cylindrical shape, and an internal space 85ba thereof communicates with the internal space in box main body 85a.

Fan 86 serves to emit the combustion gas (of which heat has been exchanged in secondary heat exchanger 84) which has passed through secondary heat exchanger 84 to the outside of water heating apparatus 100 by suctioning the combustion gas. This fan 86 is located downstream of exhaust box 85 and secondary heat exchanger 84 in the flow of the combustion gas. Namely, in water heating apparatus 100, burner 82, primary heat exchanger 83, secondary heat exchanger 84, exhaust box 85, and fan 86 are disposed in this order from upstream to downstream in the flow of the combustion gas produced in burner 82. Since the combustion gas is suctioned and exhausted by means of fan 86 as above in this arrangement, water heating apparatus 100 in the present embodiment is the water heating apparatus adapted to the exhaust suction and combustion system.

Fan 86 mainly has a rotor 86a, a fan case 86b, a drive source 86c, and a rotation shaft 86d. Fan case 86b is attached to fan connection portion 85b of exhaust box 85 such that an internal space in fan case 86b and the internal space in fan connection portion 85b communicate with each other. Thus, as shown with hollow arrows in FIG. 13, the combustion gas can be suctioned from box main body 85a of exhaust box 85 through fan connection portion 85b into fan case 86b.

Rotor 86a is arranged in fan case 86b. This rotor 86a is connected to drive source 86c with rotation shaft 86d being interposed. Thus, rotor 86a is provided with drive force from drive source 86c and can rotate around rotation shaft 86d. With rotation of rotor 86a, the combustion gas in exhaust box 85 can be suctioned from an inner circumferential side of rotor 86a and can be emitted toward an outer circumferential side of rotor 86a.

Connection pipe 87 is connected to a region within fan case 86b, on the outer circumferential side of a region where rotor 86a is arranged. Therefore, the combustion gas emitted to the outer circumferential side of rotor 86a by rotor 86a of fan 86 can be emitted into exhaust tube 20 through connection pipe 87.

The combustion gas produced by burner 82 as above is suctioned by fan 86 with rotation of rotor 86a above, so that the combustion gas can reach fan 86 after passage through primary heat exchanger 83, secondary heat exchanger 84, and exhaust box 85 in this order as shown with the hollow arrows in FIG. 13 and can be exhausted to the outside of water heating apparatus 100.

Drainage water tank 88 serves to store drainage water produced in secondary heat exchanger 84. This drainage water tank 88 is connected to secondary heat exchanger 84 through pipe 90. Pipe 90 is connected to drainage water discharge port 84a of secondary heat exchanger 84. Thus, the drainage water produced in secondary heat exchanger 84 can be discharged to drainage water tank 88. Pipe 95 extending to the outside of water heating apparatus 100 is connected to drainage water tank 88. The drainage water stored in drainage water tank 88 can be discharged to the outside of water heating apparatus 100 through this pipe 95.

This drainage water tank 88 has a water seal structure. Namely, drainage water tank 88 has such a structure that, as a prescribed amount of drainage water is stored in drainage water tank 88, the stored drainage water cannot allow air to pass through drainage water tank 88. With such a water seal structure of drainage water tank 88, entry of air outside water heating apparatus 100 (outside air) into water heating apparatus 100 (secondary heat exchanger 84) through drainage water tank 88 via pipe 95 can be prevented.

A lower portion of drainage water tank 88 is connected to drainage water drain piping 96 separately from pipe 95. This drainage water drain piping 96 (which is normally closed) is designed so as to be able to discharge drainage water within drainage water tank 88 which cannot be discharged through pipe 95, by opening drainage water drain piping 96 during maintenance. The internal space in drainage water tank 88 may be filled with a neutralization agent (not shown) for neutralizing acid drainage water.

Water supply pipe 92 is connected to one end of heat conduction pipe 84b of secondary heat exchanger 84 and hot water delivery pipe 93 is connected to one end of heat conduction pipe 83a of primary heat exchanger 83. The other end of heat conduction pipe 83a of primary heat exchanger 83 and the other end of heat conduction pipe 84b of secondary heat exchanger 84 are connected to each other through pipe 94. Each of gas supply pipe 91, water supply pipe 92, and hot water delivery pipe 93 leads to the outside, for example, in a top portion of water heating apparatus 100. Burner 82, primary heat exchanger 83, secondary heat exchanger 84, exhaust box 85, fan 86, and drainage water tank 88 are arranged in housing 89.

Housing 89 has connection portion 89a and exhaust portion 89b. Specifically, tubular connection portion 89a protruding upward and tubular exhaust portion 89b protruding upward are concentrically provided on an upper surface of housing 89. Connection portion 89a and exhaust portion 89b form a double tube structure.

Connection portion 89a is provided to surround an outer circumferential surface of exhaust portion 89b and a connection hole is provided in a region between the outer circumferential surface of exhaust portion 89b and an inner circumferential surface of connection portion 89a in housing 89. An exhaust vent is provided inside exhaust portion 89b in housing 89. The connection hole communicates with the inside of housing 89 and the exhaust vent communicates with the inside of connection pipe 87. Therefore, a gap provided between the outer circumferential surface of exhaust tube 20 and the inner circumferential surface of connection piping 60 communicates with an internal space in housing 89 through the connection hole provided in housing 89. Combustion gas after passing burner 82 is sent to exhaust tube 20 from connection pipe 87 through exhaust portion 89b.

Connection portion 89a is connected to connection piping 60 on a side of one end portion of connection piping 60 and exhaust portion 89b is connected to exhaust tube 20 on a side of one end portion 20a of exhaust tube 20. Exhaust portion 89b is connected also to connection pipe 87 accommodated in housing 89. For example, with projection of exhaust portion 89b also downward in a tubular manner from the upper surface of housing 89, connection between exhaust portion 89b and connection pipe 87 is facilitated.

Connection portion 89a and connection piping 60 should only be connected to each other so as not to allow leakage of gas which flows in the inside. Similarly, exhaust portion 89b and exhaust tube 20 (and connection pipe 87) should be connected to each other with exhaust connection structure 10 so as not to allow leakage of gas which flows in the inside. Therefore, an O ring may be interposed between exhaust portion 89b and exhaust connection structure 10, and both of them may firmly be bound to each other by using a binding band. A state of fitting of each portion may be inner cover or outer cover.

A function and effect of the present embodiment will now be described.

According to the present embodiment, as shown in FIG. 8, exhaust joint 10a has engaging portion 2b for direct engagement with the projections and recesses in the outer circumferential surface of exhaust tube 20. Therefore, need for a connection adapter interposed between exhaust joint 10a and exhaust tube 20 is obviated. Therefore, the number of parts can be reduced. Since the number of parts is reduced, construction for connecting combustion apparatus 100 and exhaust tube 20 with exhaust connection structure 10 being interposed is facilitated.

Sealing member 10b is arranged between the outer circumferential surface of exhaust tube 20 and the inner circumferential surface of exhaust joint 10a. Therefore, leakage of an exhaust in combustion apparatus 100 from the portion of connection between exhaust tube 20 and exhaust joint 10a is suppressed. Good sealability can thus be obtained.

As shown in FIG. 8, there is a gap G between the outer circumferential surface of engagement member 2 and the inner circumferential surface of nut member 3. When exhaust tube 20 is inserted in engagement member 2, a diameter of engagement member 2 can be increased, so that insertion of exhaust tube 20 in engagement member 2 and connection between combustion apparatus 100 and exhaust tube 20 with exhaust connection structure 10 are facilitated.

By screwing screw portion 3b of nut member 3 to screw portion 1aa of exhaust tube connection portion 1a, nut member 3 can readily be attached to exhaust joint 10a. With nut member 3 being attached to exhaust joint 10a, locking portion 3c of nut member 3 prevents engagement member 2 from coming out of joint body 1. Therefore, engagement member 2 does not come out of joint body 1 in this state.

By unscrewing nut member 3 from exhaust joint 10a, engagement member 2 and nut member 3 can be removed from joint body 1. Therefore, with the engagement member having been removed from joint body 1, exhaust tube 20 can be inserted into engagement member 2, and engagement member 2 in which exhaust tube 20 has been inserted can be attached to joint body 1 with nut member 3. Therefore, connection of exhaust tube 20 to exhaust connection structure 10 is facilitated.

With the engagement member having been removed from joint body 1, exhaust tube 20 can be inserted into engagement member 2 and sealing member 10b can be attached to the outer circumference of exhaust tube 20. Therefore, attachment of sealing member 10b is also facilitated.

Sealing member 10b is arranged closer to combustion apparatus connection portion 1b than screw portion 3b of nut member 3 and screw portion 1aa of exhaust tube connection portion 1a. Thus, sealing with sealing member 10b is less likely to be affected by defective molding caused in molding of screw portions 3b and 1aa. Therefore, sealability is further improved.

Distance L between sealing member 10b and the opening end of exhaust tube connection portion 1a is equal to or greater than inner diameter ID4 of exhaust tube 20. Thus, distance L over which the outer circumferential surface of exhaust tube 20 faces the inner circumferential surface of exhaust tube connection portion 1a can be increased. Therefore, exhaust tube 20 is less likely to come out of exhaust tube connection portion 1a even when exhaust tube 20 is bent for installation at the time of installation of the exhaust connection structure.

As shown in FIG. 4, screw portion 3b of nut member 3 has first threaded portion 3ba and second threaded portion 3ba separate from each other in the circumferential direction. Thus, mold layout in molding of nut member 3, for example, with resin molding is facilitated and molding of nut member 3 is facilitated.

As shown in FIG. 8, exhaust tube connection portion 1a is located on one side of bent portion 1c and combustion apparatus connection portion 1b is located on the other side of bent portion 1c. Since exhaust tube connection portion 1a is located on one side of bent portion 1c, a position of insertion of one end portion 20a of exhaust tube 20 opposed to the inner circumferential surface of exhaust joint 10a can be located before bent portion 1c. Since exhaust tube 20 can thus be installed not to be located in bent portion 1c, there is no influence by loss of a pressure caused when exhaust tube 20 is located in bent portion 1c.

Inner diameter ID3 of exhaust joint 10a at bent portion 1c is equal to inner diameter ID1 of exhaust joint 10a at exhaust tube connection portion 1a at a portion of connection to bent portion 1c and inner diameter ID2 of exhaust joint 10a at combustion apparatus connection portion 1b. Thus, inner diameters ID1 to ID3 of exhaust joint 10a are not varied at bent portion 1c and portions before and after bent portion 1c. Therefore, fluctuation in resistance in a flow path for the exhaust which flows through exhaust joint 10a is suppressed.

As shown in FIG. 8, wall portion 1ae for abutment on one end portion 20a of exhaust tube 20 is provided on the inner circumferential surface of exhaust tube connection portion 1a located closer to combustion apparatus connection portion 1b than sealing member 10b. Wall portion 1ae thus functions as a stopper at which exhaust tube 20 abuts in insertion of exhaust tube 20 in exhaust tube connection portion 1a. Therefore, control of a length of insertion of exhaust tube 20 into exhaust tube connection portion 1a is easy and accuracy in construction is improved.

As shown in FIG. 7, sealing member 10b is arranged to cover the outer periphery of each of first recess 20da, projection 20c, and second recess 20db in the projections and recesses in the outer circumferential surface of exhaust tube 20. Leakage of the exhaust from between sealing member 10b and the outer circumferential surface of exhaust tube 20 is thus suppressed and sealability is improved.

As shown in FIG. 3, annular portion 2a of engagement member 2 is cut such that annular portion 2a is discontinuous in the circumferential direction. Thus, in insertion of exhaust tube 20 into annular portion 2a of engagement member 2, annular portion 2a readily increases in diameter as shown in FIGS. 9 and 10. Therefore, insertion of exhaust tube 20 into annular portion 2a is facilitated.

As shown in FIG. 11, since angle of inclination θ1 of first surface 1af on the side of the opening end of exhaust tube connection portion 1a is greater than angle of inclination θ2 of second surface 1ag, a diameter of the opening in exhaust tube connection portion 1a increases toward the opening end. Therefore, insertion of exhaust tube 20 into exhaust tube connection portion 1a is facilitated. Angle of inclination θ2 of second surface 1ag close to combustion apparatus connection portion 1b is smaller than angle of inclination θ1 of first surface 1af. Therefore, with insertion of exhaust tube 20 into a portion of second surface 1ag toward combustion apparatus connection portion 1b, pressing force between second surface 1ag and sealing member 10b gradually increases. Thus, as exhaust tube 20 is inserted toward combustion apparatus connection portion 1b, sealability is gradually improved.

Figure 10:
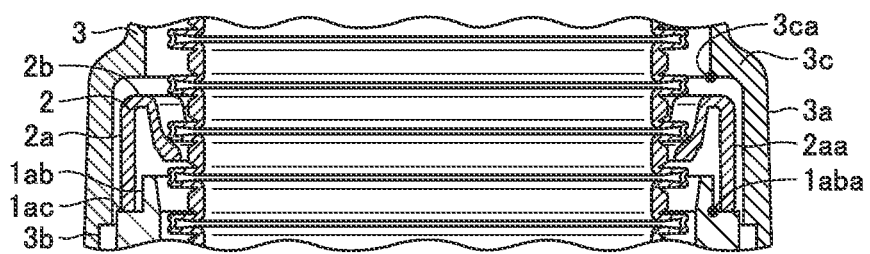
FIG. 10 is a partial cross-sectional view showing a state that the exhaust tube has been inserted in the engagement member included in the exhaust connection structure in one embodiment of the present invention.

As shown in FIG. 10, the surface on the inner circumferential side of the portion folded back toward the inner circumference of engaging portion 2b is formed as the surface connected at a smooth curvature. Therefore, damage to the outer circumferential surface of exhaust tube 20 by the surface on the inner circumferential side of the portion folded back toward the inner circumference of engaging portion 2b is suppressed in insertion of exhaust tube 20 in engagement member 2.

Figure 14:
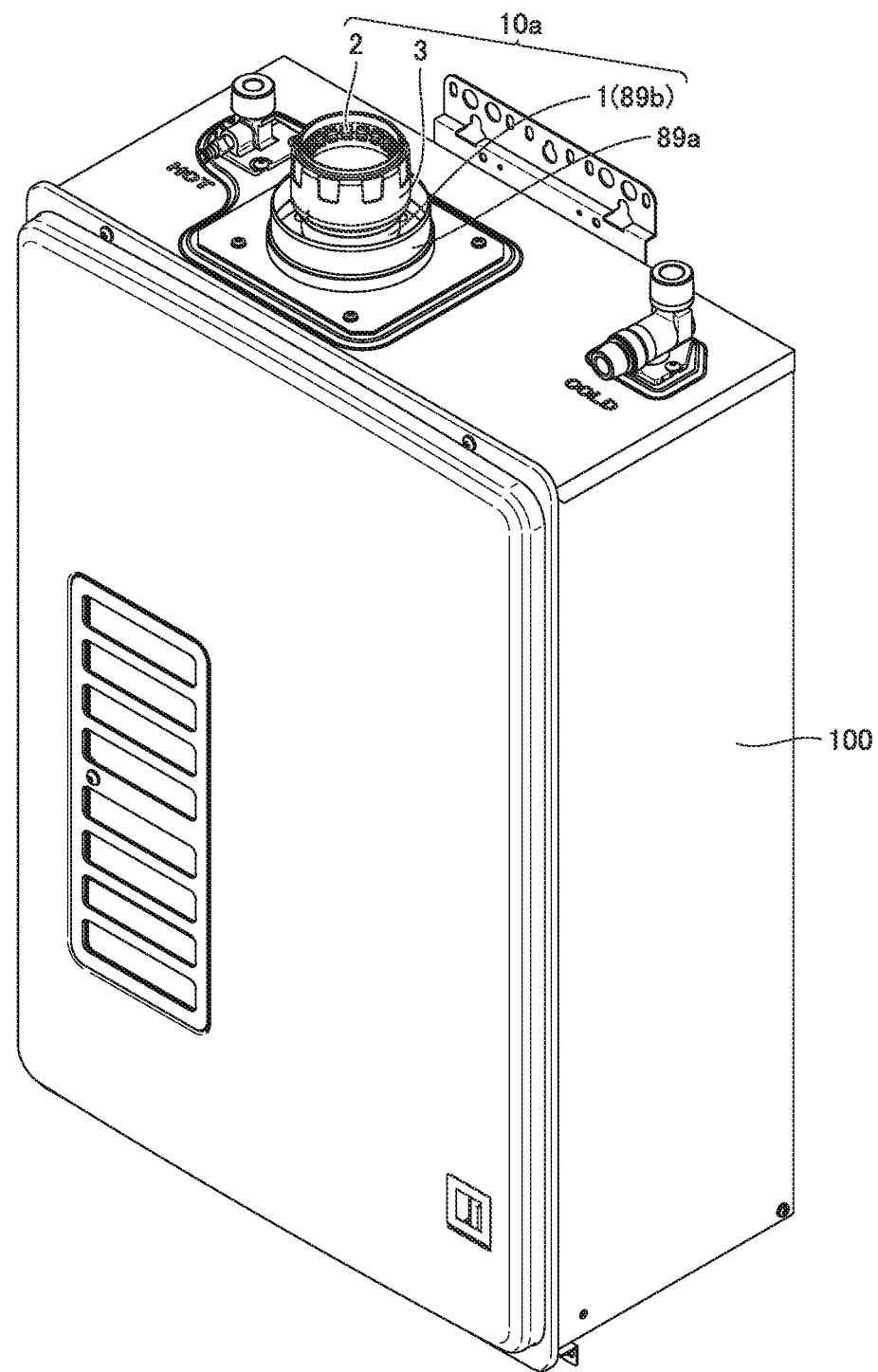
FIG. 14 is a perspective view showing a modification in which the exhaust joint included in the exhaust connection structure in one embodiment of the present invention is integrally attached to the combustion apparatus.

Though an example in which exhaust joint 10a is separate from combustion apparatus 100 as shown in FIG. 2 is described in the embodiment, exhaust joint 10a may be formed integrally with combustion apparatus 100 as shown in FIG. 14. Joint body 1 included in exhaust joint 10a may be a member common to exhaust portion 89b of combustion apparatus 100.

Though the embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. An exhaust connection structure constructed to connect a combustion apparatus and an exhaust tube having projections and recesses in an outer surface, the exhaust connection structure comprising:
    a sealing member arranged on an outer circumferential surface of the exhaust tube; and
    an exhaust joint which has an inner circumferential surface opposed to the outer circumferential surface of the exhaust tube and is arranged to sandwich the sealing member between the inner circumferential surface and the outer circumferential surface of the exhaust tube, the exhaust joint including:
        an engagement member having an annular portion and an engaging portion bent toward an inner circumference of the annular portion, and the engaging portion being constructed to be engaged with the projections and recesses in the exhaust tube in a state where the exhaust tube is inserted in the annular portion of the engaging portion;
        a joint body having a combustion apparatus connection portion for connection to the combustion apparatus and an exhaust tube connection portion for connection to the exhaust tube, to which the engagement member is attached; and
        a nut member having a screw portion screwed to the exhaust tube connection portion and a locking portion for preventing the engagement member from coming out of the joint body, wherein
    there is a gap in which the engagement member increases in diameter with insertion of the exhaust tube between the outer circumferential surface of the engagement member and the inner circumferential surface of the nut member,
    the sealing member is located between the outer circumferential surface of the exhaust tube and the inner circumferential surface of the exhaust tube connection portion and arranged closer to the combustion apparatus connection portion than the screw portion, and
    a distance between the sealing member and an opening end of the exhaust tube connection portion is equal to or greater than at least an inner diameter of the exhaust tube.

2. A combustion apparatus with exhaust connection structure comprising:
    the exhaust connection structure according to claim 1; and
    a combustion apparatus to which the exhaust connection structure is attached.

3. The combustion apparatus with exhaust connection structure according to claim 2, wherein
    the combustion apparatus is a water heating apparatus, and
    the exhaust tube defines an emission path for an exhaust produced in the water heating apparatus.

4. An exhaust connection structure constructed to connect a combustion apparatus and an exhaust tube having projections and recesses in an outer surface, the exhaust connection structure comprising:
    a sealing member arranged on an outer circumferential surface of the exhaust tube; and
    an exhaust joint which has an inner circumferential surface opposed to the outer circumferential surface of the exhaust tube and is arranged to sandwich the sealing member between the inner circumferential surface and the outer circumferential surface of the exhaust tube, the exhaust joint including:
        an engagement member having an annular portion and an engaging portion bent toward an inner circumference of the annular portion, and the engaging portion being constructed to be engaged with the projections and recesses in the exhaust tube in a state where the exhaust tube is inserted in the annular portion of the engaging portion;
        a joint body having a combustion apparatus connection portion for connection to the combustion apparatus and an exhaust tube connection portion for connection to the exhaust tube, to which the engagement member is attached; and
        a nut member having a screw portion screwed to the exhaust tube connection portion and a locking portion for preventing the engagement member from coming out of the joint body, wherein
    there is a gap in which the engagement member increases in diameter with insertion of the exhaust tube between the outer circumferential surface of the engagement member and the inner circumferential surface of the nut member, the screw portion has a first threaded portion and a second threaded portion, and the first threaded portion and the second threaded portion are separate from each other in a circumferential direction.

5. A combustion apparatus with exhaust connection structure comprising:

the exhaust connection structure according to claim 4; and a combustion apparatus to which the exhaust connection structure is attached.

6. The combustion apparatus with exhaust connection structure according to claim 5, wherein the combustion apparatus is a water heating apparatus, and the exhaust tube defines an emission path for an exhaust produced in the water heating apparatus.

7. An exhaust connection structure constructed to connect a combustion apparatus and an exhaust tube having projections and recesses in an outer surface, the exhaust connection structure comprising:

a sealing member arranged on an outer circumferential surface of the exhaust tube; and an exhaust joint which has an inner circumferential surface opposed to the outer circumferential surface of the exhaust tube and is arranged to sandwich the sealing member between the inner circumferential surface and the outer circumferential surface of the exhaust tube, the exhaust joint including:

an engagement member having an annular portion and an engaging portion bent toward an inner circumference of the annular portion, and the engaging portion being constructed to be engaged with the projections and recesses in the exhaust tube in a state where the exhaust tube is inserted in the annular portion of the engaging portion;

a joint body having a combustion apparatus connection portion for connection to the combustion apparatus and an exhaust tube connection portion for connection to the exhaust tube, to which the engagement member is attached; and a nut member having a screw portion screwed to the exhaust tube connection portion and a locking portion for preventing the engagement member from coming out of the joint body, wherein there is a gap in which the engagement member increases in diameter with insertion of the exhaust tube between the outer circumferential surface of the engagement member and the inner circumferential surface of the nut member, an inner surface of the exhaust tube connection portion has a first surface located on a side of an opening end and a second surface located closer to the combustion apparatus connection portion than the first surface, and in a cross-section in parallel to an axial line of the exhaust tube connection portion, each of the first surface and the second surface is inclined with respect to the axial line such that an inner diameter of the exhaust tube connection portion is smaller toward the combustion apparatus connection portion and an angle of inclination of the first surface with respect to the axial line is greater than an angle of inclination of the second surface with respect to the axial line.

8. A combustion apparatus with exhaust connection structure comprising:

the exhaust connection structure according to claim 7; and a combustion apparatus to which the exhaust connection structure is attached.

9. The combustion apparatus with exhaust connection structure according to claim 8, wherein the combustion apparatus is a water heating apparatus, and the exhaust tube defines an emission path for an exhaust produced in the water heating apparatus.

* * * * *